US012599900B2

(12) United States Patent
Huang et al.

(10) Patent No.: US 12,599,900 B2
(45) Date of Patent: Apr. 14, 2026

(54) CATALYST FOR FUEL REFORMATION AND PREPARATION METHOD THEREOF

(71) Applicant: Institute of Nuclear Energy Research, Atomic Energy Council, Executive Yuan, R.O.C., Taoyuan (TW)

(72) Inventors: Men-Han Huang, Taoyuan (TW); Wen-Tang Hong, Taoyuan (TW); Ruey-Yi Lee, Taoyuan (TW); Fang-Tzu Chuang, Taoyuan (TW); Ming-Ruei Jiang, Taoyuan (TW)

(73) Assignee: Institute of Nuclear Energy Research, Atomic Energy Council, Executive Yuan, R.O.C., Taoyuan (TW)

( * ) Notice: Subject to any disclaimer, the term of this patent is extended or adjusted under 35 U.S.C. 154(b) by 532 days.

(21) Appl. No.: 18/128,325

(22) Filed: Mar. 30, 2023

(65) Prior Publication Data

US 2023/0405571 A1 Dec. 21, 2023

(30) Foreign Application Priority Data

Jun. 16, 2022 (TW) .................................. 111122383

(51) Int. Cl.
| | |
|---|---|
| *B01J 37/06* | (2006.01) |
| *B01J 23/83* | (2006.01) |
| *B01J 35/57* | (2024.01) |
| *B01J 37/02* | (2006.01) |
| *B01J 37/08* | (2006.01) |

(52) U.S. Cl.
CPC .............. *B01J 37/06* (2013.01); *B01J 23/83* (2013.01); *B01J 35/57* (2024.01); *B01J 37/024* (2013.01); *B01J 37/088* (2013.01)

(58) Field of Classification Search
CPC ... B01J 35/57; B01J 23/83; B01J 37/06; B01J 37/088; B01J 37/024
USPC .......................................................... 502/303
See application file for complete search history.

(56) References Cited

U.S. PATENT DOCUMENTS

2008/0167178 A1* 7/2008 Malyala ............... B01J 37/0246
502/73
2015/0352492 A1* 12/2015 Andersen ........... B01D 53/9436
502/65
2020/0360901 A1* 11/2020 Onuki ...................... B01J 23/10

FOREIGN PATENT DOCUMENTS

CN 111659364 A * 9/2020 .......... B01J 37/0207
JP S59127649 A * 7/1984

* cited by examiner

*Primary Examiner* — Anthony J Zimmer
*Assistant Examiner* — Annette Phan
(74) *Attorney, Agent, or Firm* — Demian K. Jackson; Jackson IPG PLLC

(57) ABSTRACT

A catalyst is provided for fuel reformation with its preparation method. The catalyst is an oxide catalyst of nickel (Ni), lanthanum (La), and cerium (Ce); and is loaded on a honeycomb support substrate. The catalyst comprises an oxide layer of Ni and La; and an oxide layer of Ce between the honeycomb support substrate and the oxide layer of Ni and La. The oxide layer of Ni and La comprises a 10~20 weight percent (wt %) of Ni and a 1~20 wt % of rare earth element La. The oxide layer of Ce comprises a 1~20 wt % of rare earth element Ce. The present invention is applied to solid oxide fuel cell (SOFC) for enhancing the methane conversion rate, heightening the reliability and durability of long-term operation, and improving the energy use efficiency.

5 Claims, 3 Drawing Sheets

CATALYST FOR FUEL REFORMATION AND PREPARATION METHOD THEREOF

TECHNICAL FIELD OF THE INVENTION

The present invention relates to the field of green energy; more particularly, to a catalyst for fuel cell.

DESCRIPTION OF THE RELATED ARTS

The whole world is in a critical era of energy transformation. Green energies are becoming the mainstream. Among them, hydrogen energy and fuel cells are extremely critical.

Fuel cells are new power generation technologies with high efficiency and low pollution as diversified energies. Besides, a power system of fuel cell has advantages of cleanliness and high efficiency, for example. Moreover, it can be further combined with other power generation technologies, such as bioenergy, solar energy, wind energy, etc., for diversified use, regeneration, and perpetualness.

However, recombinant catalysts inside fuel cell still use precious metal catalysts, such as platinum (Pt), to obtain better resistance to carbon deposition, where, after a long period of reaction, high activity and almost no carbon deposition can be maintained. Yet, the price of precious metal catalytic agents are expensive. Therefore, nickel (Ni)-based catalysts of high activity are introduced to reduce the cost of catalyst.

A prior art adopts hydrogen production via reforming catalyst of Ni-based granule, which uses a $\gamma$-$Al_2O_3$ support. However, the drawback is that catalytic disintegration and carbon deposition may easily occur when reacted at high temperature. Moreover, the hydrogen-rich gas produced at the rear end will also cause pulse pressure drop due to unstable flow. Even catalyst dust and carbon deposition will pollute the power system of solid oxide fuel cell at the rear end through gas pipelines for causing the system blocked, which clearly shows that the catalysts and supports have great impact on equipment. Currently, the Ni-based granule catalyst has problems of large pressure drop in floor layer, poor thermal conductivity, easily broken granular catalyst on being impacted by thermal stress, carbon deposition, etc. Especially, among them, carbon deposition will make the active center on surface of the catalyst be covered and the channels blocked; and, even in severe times, make the catalyst powdered. These, in turn, affects fuel cell power generation efficiency. Accordingly, there is an urgent need to provide an improved analysis method for solving the problems existing in previous technologies. Hence, the prior arts do not fulfill all users' requests on actual use.

SUMMARY OF THE INVENTION

The main purpose of the present invention is to enhance the efficiency of solid oxide fuel cell (SOFC), improve methane conversion rate, heighten the reliability and durability of long-term operation, and improve the energy use efficiency.

To achieve the above purpose, the present invention is a catalyst for fuel reformation, comprising a honeycomb support substrate and an oxide catalyst of nickel (Ni), lanthanum (La), and cerium (Ce), where the oxide catalyst of Ni, La, and Ce is loaded on the honeycomb support substrate; the oxide catalyst of Ni, La, and Ce comprises an oxide layer of Ni and La and an oxide layer of Ce; the oxide layer of Ce is located between the honeycomb support substrate and the oxide layer of Ni and La; the oxide layer of Ni and La comprises a 10~20 weight percent (wt %) of content of Ni and a 1~20 wt % of content of La, being two metal materials; and the oxide layer of Ce comprises a 1~20 wt % of content of Ce, being a single metal material. Furthermore, the present invention has a preparation method, comprising steps of: (a) soaking the honeycomb support substrate in dilute sulfuric acid to process acid washing; and, after being cleaned and dried, calcinating 10~14 hours (hrs) in air at a high temperature of 500~800 degrees Celsius (° C.); (b) dissolving a first soluble salt, comprising a 1~20 wt % of content of Ce, in deionized water to form a soluble salt solution of Ce; soaking the honeycomb support substrate, obtained after being calcinated in air in step (a), in the soluble salt solution of Ce; and, after being impregnated and dried, calcinating 6~9 hrs in air at a high temperature of 500~700° C. to form an oxide layer of Ce on the honeycomb support substrate; and (c) dissolving a second soluble salt, comprising a 10~20 wt % of content of Ni and a 1~20 wt % of content of La, in deionized water at a mixing ratio to form a soluble salt solution of Ni and La; soaking the honeycomb support substrate, obtained with the oxide layer of Ce after being calcinated in air in step (b), in the soluble salt solution of Ni and La; after being impregnated and dried, calcinating 6~9 hrs in air at a high temperature of 450~650° C. to form an oxide layer of Ni and La on the oxide layer of Ce; and, thus, forming an oxide catalyst of Ni, La, and Ce, comprising the oxide layer of Ni and La and the oxide layer of Ce, on the honeycomb support substrate to construct a honeycomb catalyst of Ni, La, and Ce as a whole. Accordingly, a novel catalyst for fuel reformation and a preparation method thereof are obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
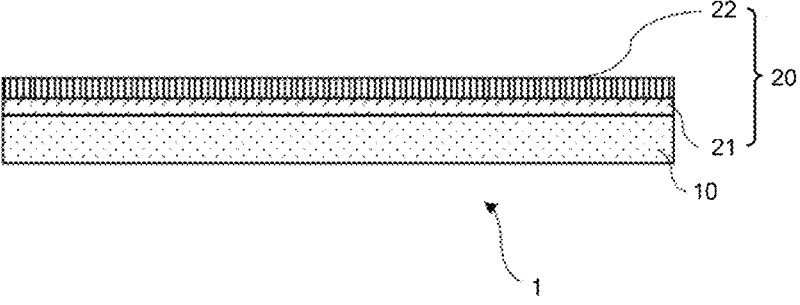
FIG. 1 is the structural view showing the preferred embodiment according to the present invention.
Figure 2:
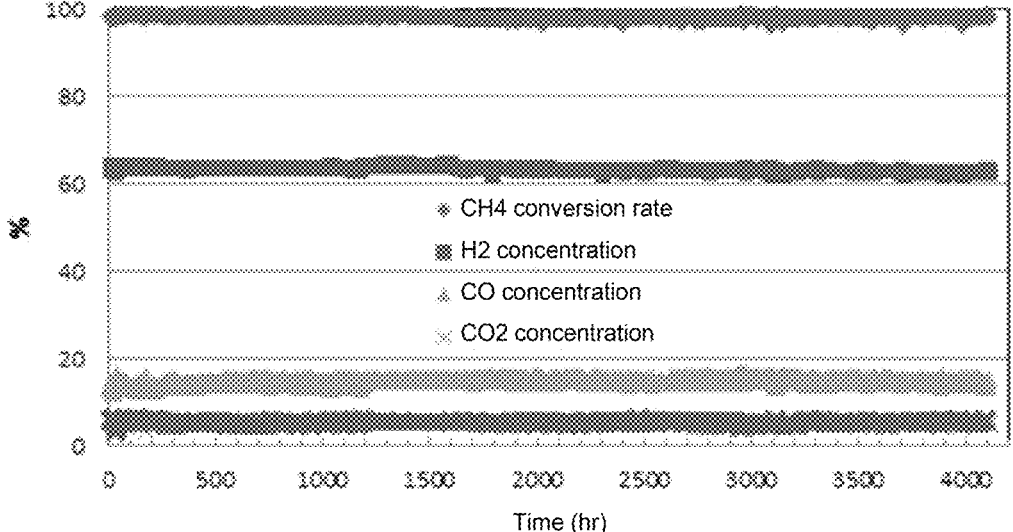
FIG. 2 is the view showing the analysis of methane conversion rate and output gas concentration.
Figure 3:
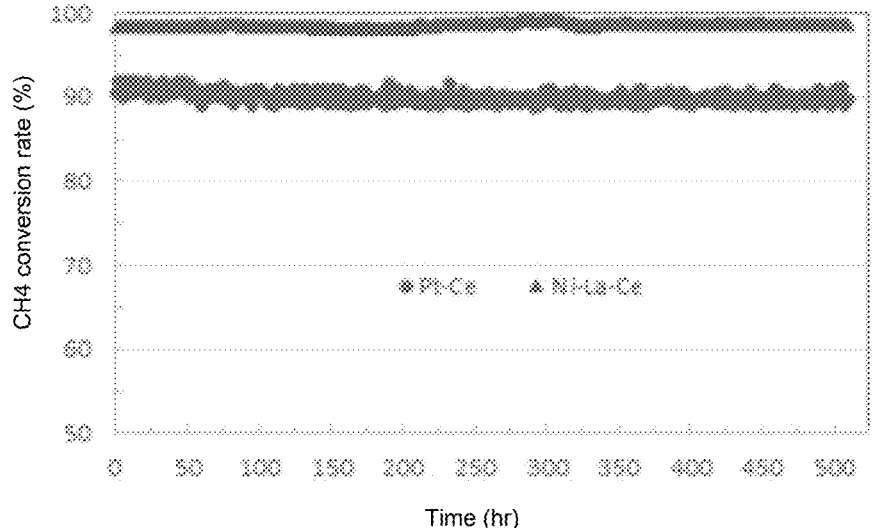
FIG. 3 is the view showing the performance comparison of the fuel reformation catalyst of the present invention and the catalyst of platinum (Pt) and cerium (Ce).

Please refer to FIG. 1 to FIG. 3, which are a structural view showing a preferred embodiment according to the present invention; a view showing an analysis of methane conversion rate and output gas concentration; and a view showing a performance comparison of the fuel reformation catalyst of the present invention and the catalyst of Pt and Ce. As shown in the figures, the present invention is a catalyst for fuel reformation, where the catalyst is used for reformation in solid oxide fuel cell (SOFC) with methane conversion rate enhanced as expected, the reliability and durability of long-term operation heightened, and the energy use efficiency improved.

The advantage of the present invention lies in the use of a low-cost metallic catalyst of nickel (Ni). With a catalytic additive containing lanthanum (La) and Ce, carbon-deposition and sintering of a Ni catalyst are successfully overcome, which defects would, in turn, lead to catalyst deactivation. Efficiency of fuel cell is improved, where the existing technologies, which mainly use precious metal catalysts such as Pt, can be replaced.

As shown in FIG. 1, the catalyst for fuel reformation according to the present invention is a honeycomb catalyst of Ni, La, and Ce 1, structurally comprising a honeycomb support substrate 10; and an oxide catalyst of Ni, La, and Ce 20 (i.e. a 10~20 weight percent (wt %) of Ni, a 10~20 wt % of La, and a 10~20 wt % of Ce) coated on an outer layer of the honeycomb support substrate 10. During preparation, a direct impregnation method is used. At first, an oxide layer of Ce 21, comprising a 1~20 wt % of content of a single metal material of rare earth element Ce, is loaded on the honeycomb support substrate 10. Then, an oxide layer of Ni and La 22, comprising two metal materials of a 10~20 wt % of content of Ni and a 1~20 wt % of content of rare earth element La, is loaded on the oxide layer of Ce 21. The oxide layer of Ce 21 and the oxide layer of Ni and La 22 form the oxide catalyst of Ni, La, and Ce 20. What is noteworthy is that the honeycomb support substrate can be other types of support substrates of no limit.

In a state-of-use, the honeycomb support substrate is of cordierite. The present invention uses temperature-resistant and low-expansion cordierite for the honeycomb support substrate to take advantages of good mechanical strength, low pipeline pressure drop, and good quality transfer efficiency, which is quite fit for gas reaction with high air flow rate. The catalyst of precious metal Pt is replaced with metal Ni having high activity to be coordinated with catalytic oxide additives of La and Ce for reducing the cost of precious metal catalyst. Furthermore, the reforming of methane vapor in fuel cells is effectively controlled for achieving thermal balance, reducing carbon deposition on catalyst surface, improving fuel cell efficiency and longevity, and achieving best overall catalytic performance. In a state-of-use, with a water-carbon mole ratio of 1.5 of the catalyst for fuel reformation, the methane conversion efficiency is at least 96%. As compared to the methane conversion efficiency of 90% of Pt catalyst with a water-carbon mole ratio of 2.5, the present invention obtains the conversion efficiency better than the Pt catalyst even with the harshest water-carbon mole ratio of 1.5, which shows the efficacy achieved is clearly better than that of the Pt catalyst.

In a state-of-use, the present invention has a preparation method, comprising the following steps:
- (a) A honeycomb support substrate 10 is soaked in dilute sulfuric acid for processing acid washing. After being cleaned and dried, calcination is processed 10~14 hours (hrs) in air at a high temperature of 500~800 degrees Celsius (° C.).
- (b) According to the catalyst composition ratio described above, a soluble salt of a 1~20 wt % of content of rare earth element Ce is dissolved in deionized water to form a soluble salt solution of Ce. The honeycomb support substrate 10, obtained after being calcinated in air in step (a), is soaked in the soluble salt solution of Ce. After being impregnated and dried, calcination is processed 6~9 hrs in air at a high temperature of 500~700° C. to form an oxide layer of Ce 21 on the honeycomb support substrate 10.
- (c) According to the catalyst composition ratio described above, a soluble salt of a 10~20 wt % of content of Ni and a 1~20 wt % of rare earth element La are dissolved in deionized water at a mixed ratio to form a soluble salt solution of Ni and La. The honeycomb support substrate 10, obtained with the oxide layer of Ce 21 after being calcinated in air in step (b), is soaked in the soluble salt solution of Ni and La. After being impregnated and dried, calcination is processed 6~9 hrs in air at a high temperature of 450~650° C. to form an oxide layer of Ni and La 22 on the oxide layer of Ce 21. Thus, an oxide catalyst of Ni, La, and Ce 20, comprising the oxide layer of Ce 21 and the oxide layer of Ni and La 22, is fabricated on the honeycomb support substrate 10 to construct a honeycomb catalyst of Ni, La, and Ce 1 as a whole. In a state-of-use, the soluble salts are nitrates.

State-of-use 1: Catalyst for Fuel Reformation

A catalyst for fuel reformation according to the present invention comprises: an oxide catalyst of Ni, La, and Ce, mainly comprising Ni, La, and Ce and, among them, using La and Ce as adjuvants; and a honeycomb support substrate. The ratios of various components of the oxide catalyst of Ni, La, and Ce are shown in Table 1:

TABLE 1

| | |
|---|---|
| Ni | 12 wt % |
| La | 3 wt % |
| Ce | 9 wt % |

State-of-use 2: Preparation Method for Catalyst for Fuel Reformation

In this state-of-use, a method for preparing a catalyst for fuel reformation is revealed, comprising the following steps:
- (a) Cordierite is obtained for a honeycomb support substrate. The honeycomb support substrate 10 is soaked in 10% dilute sulfuric acid for processing acid washing. After being cleaned and dried, calcination is processed 12 hrs in air at a high temperature of 500~800° C.
- (b) According to the catalyst composition ratio, a soluble salt of rare earth element Ce (such as cerium nitrate) is dissolved in deionized water to form a soluble salt solution of Ce. The honeycomb support substrate, obtained after being calcinated in air in step (a), is soaked in the soluble salt solution of Ce. After being completely impregnated to be dried and baked out, calcination is processed 8 hrs in air at a high temperature of 600° C. to form an oxide layer of Ce on the honeycomb support substrate.
- (c) According to the catalyst composition ratio, a soluble salt of metallic Ni (such as nickel nitrate) and a soluble salt of rare earth element La (such as lanthanum nitrate) are dissolved in deionized water to form a soluble salt solution of Ni and La. The honeycomb support substrate, obtained after being calcinated in air in step (b), is soaked in the soluble salt solution of Ni and La. After being completely impregnated to be dried and baked out, calcination is processed 8 hrs in air at a high temperature of 550° C. to form an oxide layer of Ni and La on the oxide layer of Ce. Thus, an oxide catalyst of Ni, La, and Ce, comprising the oxide layer of Ce and the oxide layer of Ni and La, is fabricated on the honeycomb support substrate to construct a catalyst for fuel reformation (i.e. a honeycomb catalyst of Ni, La, and Ce) as a whole.

With a catalyst for fuel reformation prepared according to the present invention to be filled into a methane gas reformer of SOFC, the catalytic reaction is processed with the oxide catalyst of Ni, La, and Ce on the honeycomb support substrate while low pressure drop, large response area, and high mechanical strength achieved under the same flow rate. During the reforming of methane vapor, the methane conversion rate and gas production rate are increased to contribute to the conversion efficiency of fuel cell. According to a result of this state-of-use, the catalyst for fuel reformation according to the present invention has a high catalytic performance. With a battery system at 800° C., methane and water vapor are used for hydrogen generation through reforming. After adjusting a water-carbon mole ratio to 1.5~3.5, the strictest water-carbon mole ratio of 1.5 obtains an output measurement of methane conversion rate of at least 96%.

Nevertheless, the honeycomb catalyst of Ni, La, and Ce according to the present invention has good carbon deposition resistance and its mechanical strength is high. With a high temperature of 800° C. and a water-carbon mole ratio of 2.5, the reforming is continuously processed for 4000 hrs with no decline in catalytic performance, as the result shown in FIG. 2.

The advantage of the preparation method according to the present invention is the use of direct impregnation, where the method is simple, the conditions are easy to control, and the catalyst is low in cost.

State-of-use 3: Efficiency Comparison Between the Present Invention and Pt Catalyst The honeycomb catalyst of Ni, La, and Ce (i.e. comprising a 12 wt % of Ni, a 3 wt % of La, and a 9 wt % of Ce) of State-of-use 1 is compared with a catalyst of Pt and Ce (i.e. comprising a 3 wt % of La and a 12 wt % of Ce). An experiment is processed as follows: After a methane gas is evenly mixed with water vapor, a preheating to 300° C. is processed. Then, reaction is processed with a reformer with a reaction temperature of 800° C., a water-carbon mole ratio of 2.5, and a space flow rate of gas passing through the catalyst as a gas hourly space velocity of 1500~4500 ml/g·h.

In an experimental result shown in FIG. 3, the conversion rate of methane in the catalyst for fuel reformation according to the present invention is as high as 98%, which is better than the methane conversion rate of Pt catalyst as 90%. It shows that the present invention has advantages in, e.g., high catalytic properties and carbon-deposition resistance; and, furthermore, the cost is low for mass use in industry.

As is described above, the present invention provides a catalyst for reforming in SOFC, which is placed in the heating tube of the main body for methane reforming with a honeycomb-shaped support having a honeycomb-shaped channels parallel to the main shaft of the heating tube. Cordierite is used as a material of the honeycomb support substrate for further reducing pipeline pressure drop and airflow thermal shock. The active catalyst uses oxides of La and Ce as catalyst additives to assist active molecules of Ni; and is impregnated and coated on the honeycomb support substrate to prepare a honeycomb catalyst of Ni, La, and Ce. With the comparison to the methane conversion rate of the catalyst having the different metal composites described above after 4,000 hrs of testing, the present invention obviously eliminates the crushing problem of the catalyst; the catalyst maintains high activity and thermal stability with almost no carbon deposition; after reforming, the methane conversion rate reaches 98%; and the catalyst still maintains good catalytic responsiveness. Hence, the honeycomb catalyst of Ni, La, and Ce according to the present invention has advantages of low pipeline pressure drop, high catalytic activity, and carbon-deposition resistance, which is fairly suitable for gas reaction with high gas hourly space velocity. Moreover, metal Ni has advantages of low price, abundant yield, and high activity for replacing precious metal catalyst such as Pt that are currently commonly used and, in turn, effectively reducing the cost.

To sum up, the present invention is a catalyst for fuel reformation and a preparation method thereof, where a honeycomb catalyst of Ni, La, and Ce can withstand the high temperature of SOFC to be operated under a water-carbon mole ratio of 1.5~3.5 and gas hourly space velocity simultaneously; a simple preparation method for the catalyst is provided; metal Ni is used to replace the high catalytic activity of Pt while oxides of La and Ce are used as catalytic additives; and the cost of precious metal catalyst is reduced while the effects of high reactive activity, strong carbon deposition resistance, and good stability are obtained for achieving the best overall catalytic performance advantage.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A catalyst for fuel reformation comprising
   a honeycomb support substrate and
   an oxide catalyst of nickel (Ni), lanthanum (La), and cerium (Ce), said oxide catalyst of Ni, La, and Ce being loaded on said honeycomb support substrate, wherein said oxide catalyst of Ni, La, and Ce comprises an oxide layer of Ni and La; and an oxide layer of Ce, said oxide layer of Ce being deposed between said honeycomb support substrate and said oxide layer of Ni and La; said oxide layer of Ni and La comprises 12 weight percent (wt %) of content of Ni and 3 wt % of content of La, being two metal materials; and said oxide layer of Ce comprises 9 wt % of content of Ce, being a single metal material.

2. The catalyst according to claim 1, wherein said honeycomb support substrate is of cordierite.

3. The catalyst according to claim 1, wherein the catalyst has a preparation method comprising steps of:
   (a) soaking said honeycomb support substrate in dilute sulfuric acid to process acid washing; and, after being cleaned and dried, calcinating 10~14 hours (hrs) in air at a high temperature of 500~800 degrees Celsius (° C.);
   (b) dissolving a first soluble salt, comprising 9 wt % of content of Ce, in deionized water to obtain a soluble salt solution of Ce; soaking said honeycomb support substrate, obtained after being calcinated in air in step (a), in said soluble salt solution of Ce; and, after being impregnated and dried, calcinating 6~9 hrs in air at a high temperature of 500~700° C. to obtain the oxide layer of Ce on said honeycomb support substrate; and
   (c) dissolving a second soluble salt, comprising 12 wt % of content of Ni and 3 wt % of content of La, in deionized water at a mixing ratio to obtain a soluble salt solution of Ni and La; soaking said honeycomb support substrate, obtained with said oxide layer of Ce after being calcinated in air in step (b), in said soluble salt solution of Ni and La; after being impregnated and dried, calcinating 6~9 hrs in air at a high temperature of 450~650° C. to obtain the oxide layer of Ni and La on said oxide layer of Ce; and, thus, obtaining an oxide catalyst of Ni, La, and Ce, comprising said oxide layer of Ni and La and said oxide layer of Ce, on said honeycomb support substrate to obtain a honeycomb catalyst of Ni, La, and Ce as a whole.

4. The catalyst according to claim 3, wherein said first and said second soluble salts are nitrates.

5. The catalyst according to claim 3, wherein, said honeycomb support substrate is of cordierite.

\* \* \* \* \*